United States Patent
Rajamanickam et al.

(10) Patent No.: US 11,556,461 B2
(45) Date of Patent: Jan. 17, 2023

(54) MIDDLEWARE FOR TRANSPARENT USER INTERFACE TESTING

(71) Applicant: salesforce.com, Inc., San Francisco, CA (US)

(72) Inventors: Mohan Raj Rajamanickam, Port Coquitlam (CA); Jason Watt, Seattle, WA (US); Leep Chean Tan, Bellevue, WA (US)

(73) Assignee: salesforce.com, inc.

( * ) Notice: Subject to any disclaimer, the term of this patent is extended or adjusted under 35 U.S.C. 154(b) by 236 days.

(21) Appl. No.: 16/946,322

(22) Filed: Jun. 16, 2020

(65) Prior Publication Data

US 2021/0390041 A1 Dec. 16, 2021

(51) Int. Cl.
| | | |
|---|---|---|
| G06F 11/00 | (2006.01) | |
| G06F 11/36 | (2006.01) | |
| G06F 3/0484 | (2022.01) | |
| G06F 9/451 | (2018.01) | |

(52) U.S. Cl.
CPC ........ *G06F 11/3692* (2013.01); *G06F 3/0484* (2013.01); *G06F 9/451* (2018.02); *G06F 11/3684* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |

(Continued)

OTHER PUBLICATIONS

Google Scholar/Patents search—text refined (Year: 2022).*

*Primary Examiner* — Christopher S McCarthy (74) *Attorney, Agent, or Firm* — LKGlobal | Lorenz & Kopf, LLP (57) ABSTRACT

A method and apparatus for performing a user interface test by a middleware server including determining a state change of a portion of the user interface, receiving a test command indicative of a user interface functional test from a test interface, determining an auxiliary test associated with the test command, generating an altered test command requesting performance of the user interface functional test and the auxiliary test, transmitting the altered test command to the user interface, receiving a functional result from the user interface in response to the altered test command, generating an altered test result indicative of the functional result, and transmitting the altered test result to the test interface.

18 Claims, 5 Drawing Sheets

FIG. 3

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,600,401 B1 * | 3/2017 | Haischt .............. G06F 11/3688 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0023484 A1 * | 1/2012 | Demant .................... G06F 8/38 717/125 |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2017/0357568 A1 * | 12/2017 | Hughes .................... G06F 8/38 |
| 2019/0042397 A1 * | 2/2019 | Vignesh R .......... G06F 11/3692 |

\* cited by examiner

MIDDLEWARE FOR TRANSPARENT USER INTERFACE TESTING

TECHNICAL FIELD

Embodiments of the subject matter described herein relate generally to user interface testing. More particularly, embodiments of the subject matter relate to determining a state change of a portion of the user interface, receiving a test command and testing the portion of the user interface in response to a test command and a related auxiliary command.

BACKGROUND

As web-based user interfaces become more complex and the use of multiple user operating systems, access software, and access devices increase, the need for user interface testing increases. In addition, compliance checks such as accessibility validation require APIs, libraries and frameworks to be created for each supported language, such as Java, Javascript etc. This leads to duplicated effort and maintenance overhead. These user interface tests typically require non-trivial changes in the user interface testing framework and libraries used by these user interface tests.

User interface compliance testing, such as accessibility validation, are typically targeted to be run against and cover as much unique UI surface area as possible. This increases the test run times by performing redundant tests on parts of the user interface which have not been altered. Currently developers are encouraged to add the compliance checks as part of their UI functional testing workflow, but it is difficult to manually determine the different points along the functional testing workflow when these compliance checks need to be triggered, keep track of the different UI states that need to be checked for compliance and then and add the checks at appropriate places. This increases development and maintenance overhead, thereby increasing the barrier to adoption of these compliance checks.

Accordingly, it is desirable to provide an improved method and apparatus for automated compliance checks for user interface tests. Furthermore, other desirable features and characteristics will become apparent from the subsequent detailed description and the appended claims, taken in conjunction with the accompanying drawings and the foregoing technical field and background.

SUMMARY

Disclosed herein are provision, control, and automation methods and systems and related control logic for provisioning data management servers for executing data management algorithms. By way of example, and not limitation, there is presented various embodiments of automatic web driver middleware for transparent user interface testing are disclosed herein.

In accordance with an aspect of the present disclosure, a method performed by a middleware server for testing a user interface including determining a state change of a portion of the user interface, receiving a test command indicative of a user interface functional test from a test interface, determining an auxiliary test associated with the test command, generating an altered test command requesting performance of the user interface functional test and the auxiliary test, transmitting the altered test command to the user interface, receiving a functional result from the user interface in response to the altered test command, generating an altered test result indicative of the functional result, and transmitting the altered test result to the test interface.

In accordance with another aspect of the present disclosure a middleware server for automatic performance of user interface testing including a test interface port configured for receiving a test command indicative of a user interface functional test from a test interface and for coupling an altered test result to the test interface, a user interface port configured for coupling the test command and an auxiliary test command to a user interface and for receiving a test result and an auxiliary test result from the user interface, and a processor configured to determine a state change of a portion of the user interface, for determining the auxiliary test command in response to the test command and the state change, for coupling the test command and the auxiliary test command to the user interface port, for receiving the test result and the auxiliary test result, for generating the altered test result in response to the test result and the auxiliary test result, and for coupling the altered test result to the test interface port.

In accordance with another aspect of the present disclosure, a method for testing a user interface by a middleware server including receiving a user interface test command from a test interface indicative of a user interface functional test, determining a state change of a portion of the user interface, determining an auxiliary test in response to the user interface test command and the state change, determining a functional test result in response to a performance of the user interface functional test, determining an auxiliary test result in response to a performance of the auxiliary test, generating a combined test result in response to the auxiliary test result and the functional test result, and transmitting the combined test result to the test interface.

The above advantage and other advantages and features of the present disclosure will be apparent from the following detailed description of the preferred embodiments when taken in connection with the accompanying drawings.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Methods and systems are disclosed for automatic web driver middleware for transparent user interface (UI) testing. For example, the automatic middleware server may be an intermediary node relying on the WebDriver W3C Specification to intercept WebDriver commands, execute compliance checks such as accessibility validation on the webpages navigated by WebDriver UI tests and return the results of the compliance checks back to the UI tests. The exemplary system may offer a language agnostic mechanism to perform checks on the UI pages such that WebDriver tests written in different languages can take advantage of the exemplary system and method.

The exemplary system is further configured to such that the compliance checks may be performed transparently with little to no change in the UI tests thus piggy backing on top of the existing UI testing workflows to execute additional checks on the webpages. In the context of a UI testing workflow the system is further configured to detect significant state changes to webpages to be able to determine if the UI changes are significant enough to warrant running compliance checks such as accessibility validation automatically and intelligently.

Figure 1:
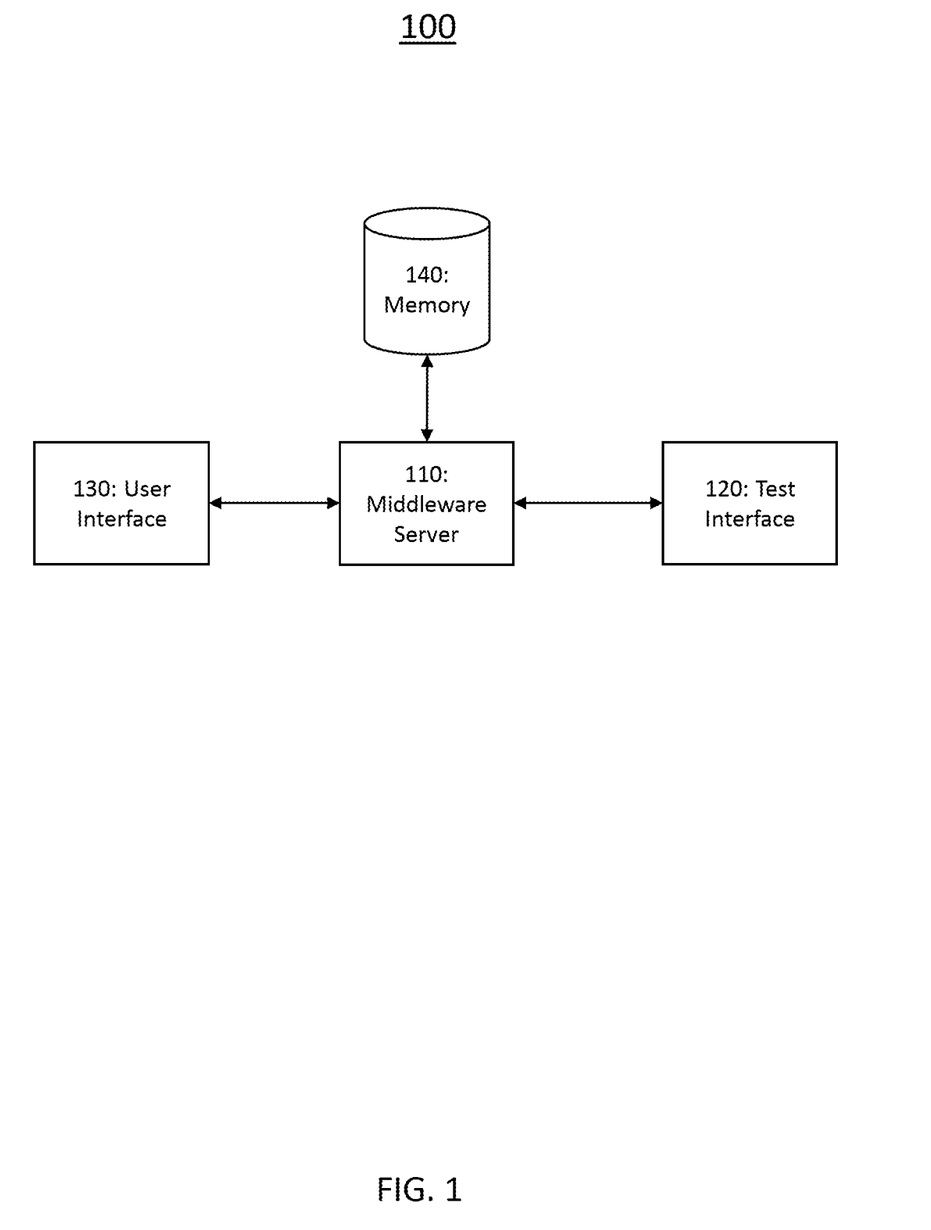
FIG. 1 shows an exemplary relationship diagram for automatic WebDriver middleware for transparent user interface testing according to an exemplary embodiment of the present disclosure.

Turning now to FIG. 1, an exemplary relationship diagram 100 for automatic WebDriver middleware for transparent user interface testing according to an exemplary embodiment of the present disclosure is shown. The exemplary relationship diagram 100 shows a user interface 130, a middleware server 110, a memory 140 and a test interface 120. In this exemplary embodiment, the middleware server 110 is operative to receive a first WebDriver command indicative of a first user interface test from the test interface 120. The middleware server 110 is then operative to generate a second WebDriver command indicative of a second user interface test, such as an accessibility check, in response to the first WebDriver command. The middleware server 110 is then operative to transmit the first WebDriver command to the user interface 130 and receive a result of the first user interface test from the user interface 130. The middleware server 110 is then operative to transmit the second WebDriver command to the user interface 130 and receive a result of the second user interface test from the user interface 130.

In this exemplary embodiment, the middleware server 110 is an intermediary node relying on the WebDriver Spec to intercept WebDriver commands from the test interface 120 and execute actions such as accessibility checks on the webpages navigated by WebDriver UI tests on the user interface 130 and return the accessibility results back to the test interface 120. The exemplary system may be platform agnostic as the middleware may be performed on different platforms. In addition, the middleware may be language agnostic such as Java, Javascript etc, with respect to the test interface 120 and/or user interface 130, to perform the accessibility checks for WebDriver tests. This beneficially facilitates application testing without having to duplicate the accessibility testing frameworks/libraries in different languages or for different platforms.

The exemplary middleware server 110 is operative to enable automatic accessibility checks transparent to the test interface 120 driving the pages on the user interface 130. The middleware server 110 may inspect and control each WebDriver command received from the test interface 120 in order to efficiently perform the additional actions to trigger accessibility checks on the user interface 130 and process the results. While the present system is described with respect to accessibility checks, the system is not restricted to accessibility checks and may be employed as a general purpose WebDriver middleware in order to execute additional actions on the page under test with minimal or no additional effort from test authors.

In one exemplary application, the middleware server 110 may be configured to run in front of a Selenium WebDriver grid/instance, such as ChromeDriver, and forward all WebDriver commands from the test interface 120 to the underlying WebDriver instance. For selected WebDriver commands, the middleware server 110 executes additional actions such as accessibility checks on the user interface 130. These actions may be done either transparently to the test interface 120 or by offering explicit commands, such as by using extension capability, JavaScript Executor or the like to the test interface 120 to trigger accessibility checks. When done transparently, the test interface 120 would not require any modifications to perform accessibility checks. Results from the accessibility checks are generated by the middleware server 110 and communicated back to the test interface 120 using HTTP response as WebDriver errors.

In one exemplary configuration, the middleware server 110 is classified as an intermediary node. To toggle automatic accessibility checking, an extension capability may be passed as part of the new session request. To request an on-demand accessibility check, a special payload may be sent using a JavaScript Executor. When an accessibility check fails, an error may be passed back to the local end. In this exemplary configuration, the WebDriver language bindings/wrappers or the test may not be required to be modified with runners outside of specifying the remote end in their configurations.

In an additional configuration, the middleware server 110 may be configured to monitor the user interface 130 to detect significant changes. The system may perform automatic and intelligent detection of significant state changes to webpages and triggering checks based on them. For example, a Javascript MutationObserver may be used to determine if there were any children added to the Document Object Model (DOM) and to retrieve a reference to that part of the subtree. If children were added to the DOM, a scoped check of accessibility tests may be run on that part of the subtree.

The MutationObserver or listeners get injected the first time accessibility tests are run on the page based on the previous findby/url tracking logic.

Figure 2:
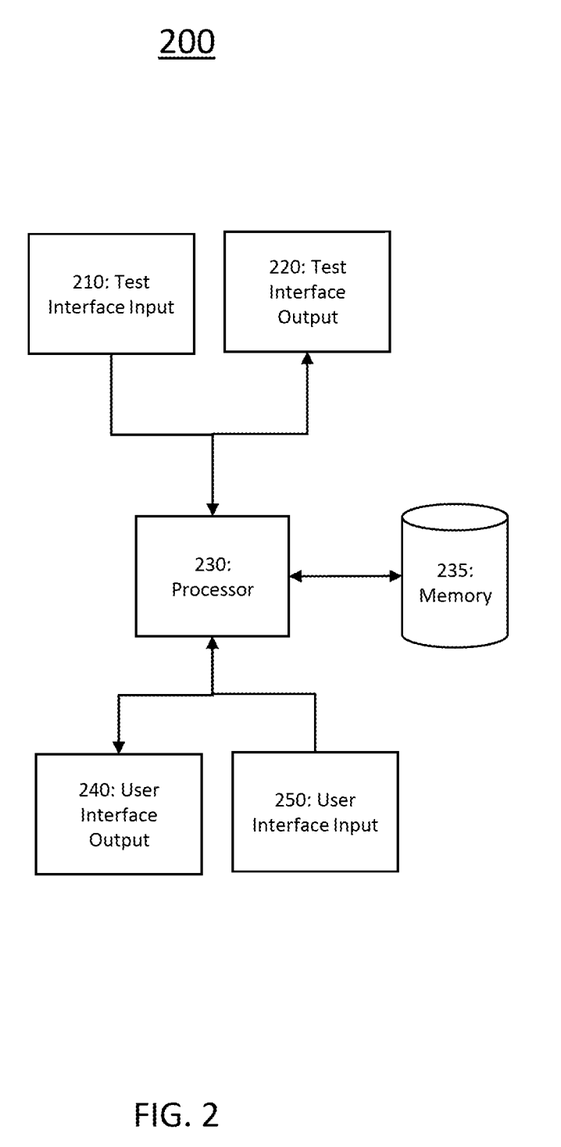
FIG. 2 is a block diagram of an exemplary system for automatic WebDriver middleware for transparent user interface testing according to an exemplary embodiment of the present disclosure.

Turning now to FIG. 2, a block diagram of a server 200 for automated performance of transparent user interface testing according to an exemplary embodiment of the present disclosure is shown. The exemplary server 200 includes a test interface input 210, test interface output 220, processor 230, memory 235, user interface output 240, and user interface input 250.

The test interface input 210 is operative to receive test commands from a test interface. The test commands may be part of a user interface test program generated by test engineers in order to ensure the proper and robust operation of a user interface before release to the user. The test command may include WebDriver commands generated to perform user interface testing on a user interface. The user interface testing may be intended to test various operational aspects of the user interface, such as user interactions with the user interface, user inputs, html script operation, regression tests, and the like.

The processor 230 is operative to receive the test command from the test interface input 210. In response to receiving the test command from the test user interface 210, the processor 230 is operative to decode the test command and then retrieve an auxiliary test command from the memory 235 associated with the test command. For example, the test command may be an automated regression test and the auxiliary may be an accessibility test script. The processor 230 is then operative to couple the test command and the auxiliary test command to the user interface output 240.

The user interface output 240 is operative to receive commands from the processor 230, such as the test command and the auxiliary command, and to couple these commands to the user interface. These commands are instructions for actions to be performed by the user interface. The user interface input 250 is operative to receive data from the user input indicative of a performance result. In this exemplary embodiment, the user interface test input 250 is operative to receive a first test result in response to the test command transmitted by the user interface test output 240 and a second test result in response to the auxiliary test command transmitted by the user interface test output 240. For example, the second test result may be indicative of results from an accessibility test performed by the user interface.

The processor 230 is configured to receive the test results from the user interface test input 250. For example, the processor 230 may receive the first test result in response to the test command and the second test result in response to the auxiliary test command. In one exemplary embodiment, the processor 230 may then generate a combined test result in response to the first test result and the second test result and couple the combined test result to the test interface output 220 for transmission to the test interface. The combined test results may be indicative of a test failure of the first test, the auxiliary test or both.

In one exemplary embodiment, the processor 230 may be further configured to inject a listener, such as a MutationObserver into the accessibility test in order to monitor the user interface for significant changes. In the context of a UI testing workflow detect significant state changes to webpages to be able to determine if the UI changes are significant enough to warrant running compliance checks such as accessibility validation automatically and intelligently (AI). In one exemplary embodiment, the listener may be configured to detect changes in the DOM. Alternatively, the listener may be configured to detect additions to the user interface or additions or saved changes to portions of the user interface.

In response to the detection of a significant change to a portion of the user interface, the processor 230 may be configured to generate an auxiliary test command to perform a user interface test, such as an accessibility test, for only the portion of the user interface subject to the significant changes or newly added portions of the user interface. In an exemplary embodiment, the processor 230 may receive a test command from a test interface via the test interface input 210. The processor 230 may then poll the listener to determine if a significant change was made to the user interface. If a significant change has been made to the user interface, the processor 230 may be operative to generate an auxiliary test command to perform a user interface test for only the portion of the user interface subject to the significant changes. Alternatively, if no significant user interface changes have been detected or determined, the processor 230 may forgo generating the auxiliary test command and only transmit the received test command to the user interface.

Figure 3:
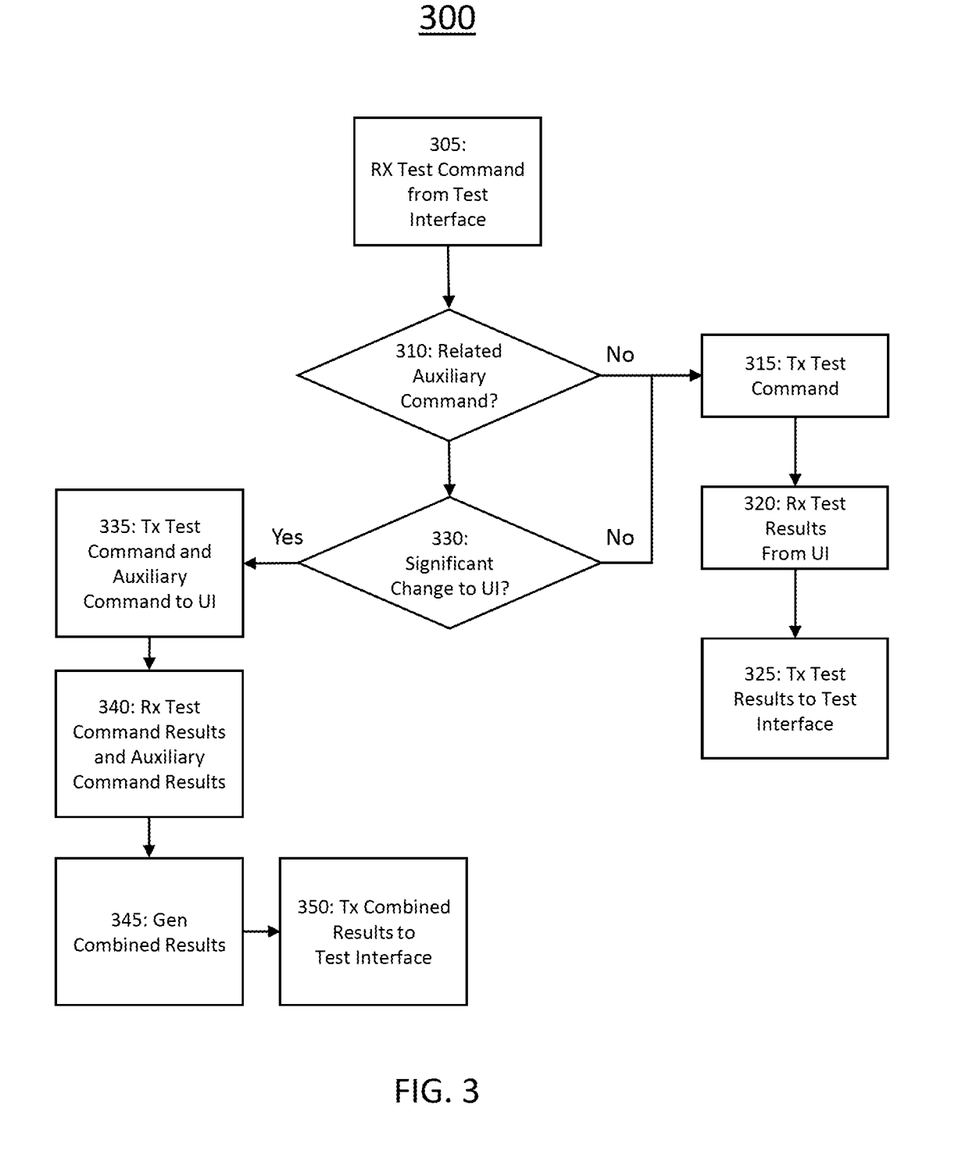
FIG. 3 is a flowchart of a method for automatic WebDriver middleware for transparent user interface testing according to an exemplary embodiment of the present disclosure.

Turning now to FIG. 3, a flowchart 300 is shown of a method for automated user interface testing according to an exemplary embodiment of the present disclosure is shown. The exemplary method may use middleware to intercept WebDriver commands between a UI testing workflow and a UI, and to run an additional set of checks on the UI in response to the intercepted WebDriver command. To save testing time and resources, the middleware program may be configured to detect significant changes to the user interface in response to a detection of certain events, such as a new attachment to the DOM and run the additional set of checks on the changed portions of the UI in response to the interception of the WebDriver command. The results are then returned to the test interface integrated with the requested results. Middleware performs additional checks that may be omitted by UI test programmers. Middleware may alter the performance response (pass, fail(reason)) in response to the outcome of the additional checks.

The method is first operative to receive 305 a test command, such as a WebDriver command, from a test interface indicative of a user interface test. The test command may include commands for validating a user interface, for verifying navigational links on the user interface, for checking usability conditions, for verifying data integrity of the user interface for verifying object states for the user interface, or for verifying field and numeric field formats of the user interface. The test command may be generated by the test interface in response to an automated user interface test routine.

The method is next operative to determine 310 if there is a related auxiliary command associated with the test command. The related auxiliary commands may be stored in a memory on a middleware server and may include commands associated with accessibility testing and the like. In one example embodiment, any test command received from the test interface may initiate the requirement to perform an auxiliary test. For example, an accessibility test command may be related to any WebDriver command received from the test interface.

If there is no related auxiliary command associated with the test command received from the test interface, the method may then transmit 315 the test command to the user interface. The user interface may perform the functions as required by the test command and then generate a test result in response to the function performance. The user interface may then return the test results to the middleware server. The method is next operative to receive 320 the test results from the user interface and to transmit 325 the test results to the test interface.

If the method determines 310 that there is an auxiliary command associated with the test command, the method is next operative to determine 330 if there has been a significant change to any portion of the user interface associated with the auxiliary command. A significant change to the user interface may be determined in response to data provided by a previously established listener, such as a MutationObserver, within the user interface, a comparison of the current DOM to a prior DOM, or by a comparison of a current version of the portion of the user interface with a prior version of the portion of the user interface. In one exemplary embodiment, the representation of the prior version may be stored on a memory proximate to the middleware server performing the exemplary method.

If it is determined that there has been no significant change to the user interface, the method may next transmit 315 the test command to the user interface. If a significant change to the user interface has been determined, the method may next be operative to transmit 335 the test command and the associated auxiliary command to the user interface. The method is then operative to receive 340 the test results in response to the test command and the auxiliary test results in response to the auxiliary command.

In response to receiving the test results and the auxiliary results, the method is then operative to generate 345 a combined result in response to the test result and the auxiliary result. The combined result may be in a format expected by the test interface in response to the test command, thereby not requiring alterations to the test routine performed by the test interface. For example, if the user interface successfully performed the commands specified by the test command but did not successfully perform the commands specified by the auxiliary command, the combined results may indicate a failure. The method is then operative to transmit 350 the generated combined result indicative of the results of the test command and results of the auxiliary command to the test interface.

Figure 4:
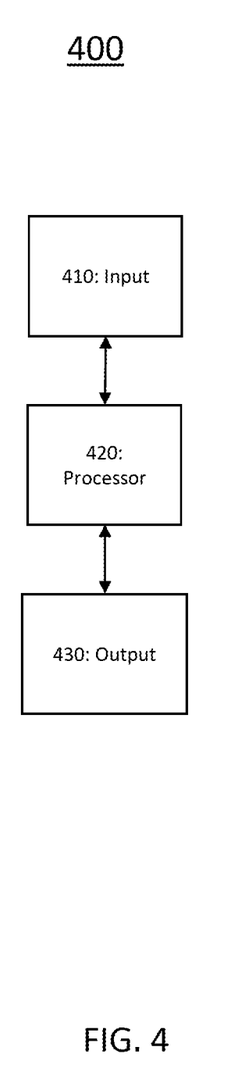
FIG. 4 is block diagram of another exemplary system for automatic WebDriver middleware for transparent user interface testing according to an exemplary embodiment of the present disclosure.

Turning now to FIG. 4, a block diagram illustrating a system 400 for automatic performance of user interface testing according to an exemplary embodiment of the present disclosure is shown. The exemplary system 400 may include a test interface port 410, a user interface port 430 and a processor 420.

In an exemplary embodiment, the test interface port 410 is configured for receiving a test command indicative of a user interface functional test from a test interface and for coupling an altered test result to the test interface. The test interface may be operative to generate the test command as part of an automated user interface testing algorithm. The test command may be indicative of a user interface functional test such as a computational request or database search command. The test interface port 410 may be further operative for coupling an altered test result to the test interface wherein altered test result may be indicative of the test result from a performance of the user interface functional test and the auxiliary test result from a performance of an accessibility test.

The processor 420 may receive the test command from the test interface port 410 and may be operative for determining the auxiliary test command in response to the test command and the state change. For example, if a user interface functional request is indicated by the test command, the processor 420 may determine that an accessibility test should also be performed and determine the auxiliary test command associated with the desired accessibility test. The processor 420 may also couple the test command and the auxiliary test command to the user interface via the user interface port 430. In response, the user interface may perform the functional testing as indicated by the test command and the auxiliary test command and generate a test result and an auxiliary test result. The processor 420 may then be configured for receiving the test result and the auxiliary test result via the user interface port 430 and for generating an altered test result in response to the test result and the auxiliary test result. The processor 420 may then couple the altered test result, indicative of the test result and the auxiliary test result to the test interface port 430 for transmission to the test interface.

The user interface port 430 may be configured for coupling the test command and an auxiliary test command to a user interface and for receiving a test result and an auxiliary test result from the user interface. In one exemplary embodiment, the test command and the auxiliary test command are coupled to the user interface through an altered test command. In one exemplary embodiment, the altered test command is indicative of the user interface functional test and an accessibility test.

In this exemplary embodiment, the processor 420 may also be configured to determine a state change of a portion of the user interface. The state change may be determined in response to polling an observer within the user interface controller, by examining a DOM, or by comparing a previous user interface version with a current user interface version. In one exemplary embodiment, an auxiliary test, such as an accessibility test, may be performed only on the portion of the user interface in response to the state change. In one example, the altered test result may be indicative of the portion of the user interface. Furthermore, the processor 420 may be operative to transmit only the test command to the user interface in response to not detecting the state change of the portion of the user interface or not determining an auxiliary test command.

Figure 5:
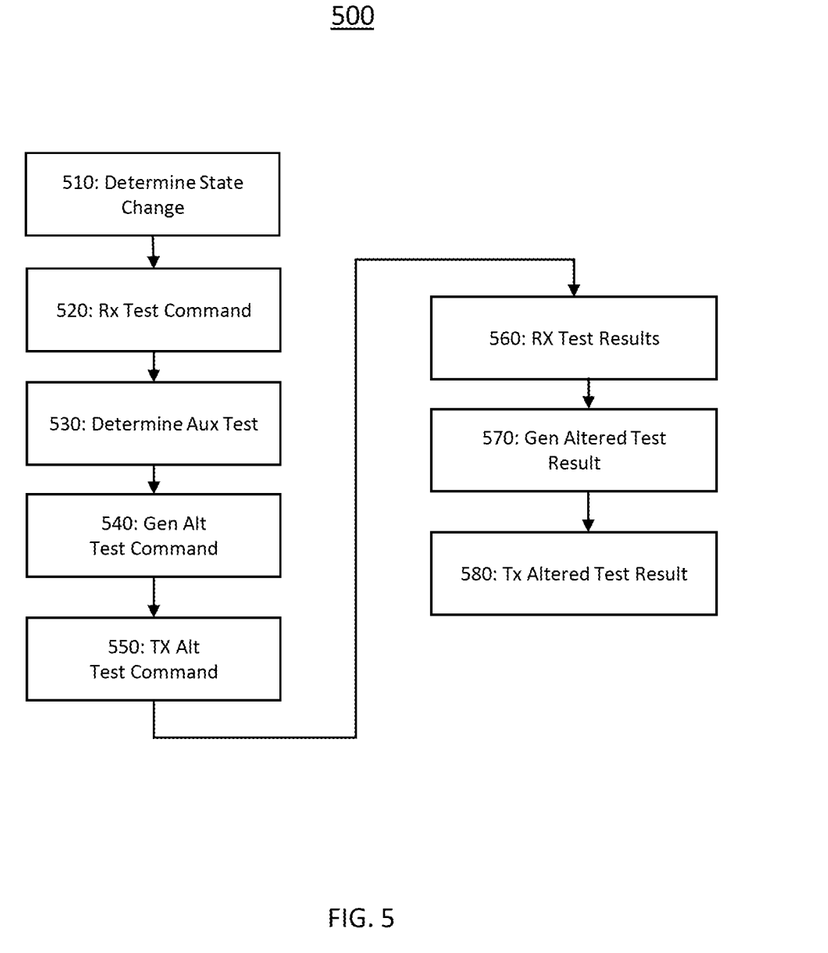
FIG. 5 is a flowchart of another method for automatic WebDriver middleware for transparent user interface testing according to an exemplary embodiment of the present disclosure.

Turning now to FIG. 5, a flowchart illustrating a method 500 for testing a user interface according to an exemplary embodiment of the present disclosure is shown. In this exemplary method, which may be performed by a middleware server, the method is configured to first determine 510 a state change of a portion of the user interface. The state change may be determined in response to a comparison to prior and current versions of the user interface, in response to a DOM, and/or in response to data from a listener or an observer integrated within the user interface.

The method is next operative for receiving 520 a test command indicative of a user interface functional test from a test interface. The user interface functional test may be a functional test to be performed on a user interface as part of a user interface testing and compliance algorithm. The method is next operative for determining 530 an auxiliary test associated with the test command. In one exemplary embodiment, the auxiliary test may be an accessibility test. In addition, the auxiliary test may not be written in the same programming language as the user interface test algorithm and/or may not be running on the same operating system.

The method is next operative for generating 540 an altered test command requesting performance of the user interface functional test and the auxiliary test. In one instance, the altered test command may include the test command and an auxiliary test command associated with the auxiliary test. Alternatively, the altered test command may be indicative of the user interface functional test and the accessibility test. In another exemplary embodiment, transmitting the altered test command may involve transmitting the test command and an auxiliary test command separately wherein the auxiliary test command is indicative of the auxiliary test.

The method is next operative for transmitting 550 the altered test command to the user interface. Alternatively, the method may also be operative to transmit the test command to the user interface in response to not detecting the state change of the portion of the user interface. In response, the method is operative for receiving 560 a functional result from the user interface in response to the altered test command. The user interface functional test may be performed only on the portion of the user interface in response to the detection of the state change of the portion of the user interface. In one example, the functional result may be indicative of a first result from a performance of the user interface functional test and a second result from a performance of the auxiliary test.

The method is next operative for generating 570 an altered test result indicative of the functional result. In one exemplary embodiment, the altered test result may be in a format expected by the test interface in response to the test command. The altered test result may be indicative of a result from both the user interface functional test and the auxiliary test. The method is then operative for transmitting 580 the altered test result to the test interface. wherein the altered test result is indicative of the portion of the user interface.

In another exemplary method according to the present disclosure, a method for testing a user interface by a middleware server is performed by a middleware server or the like for receiving a user interface test command from a test interface indicative of a user interface functional test, determining a state change of a portion of the user interface, determining an auxiliary test in response to the user interface test command and the state change, determining a functional test result in response to a performance of the user interface functional test, determining an auxiliary test result in response to a performance of the auxiliary test, generating a combined test result in response to the auxiliary test result and the functional test result, and transmitting the combined test result to the test interface. In one example, the auxiliary test is an accessibility test. Furthermore, the user interface functional test and the auxiliary test are performed only on the portion of the user interface.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The various tasks performed in connection with the process may be performed by software, hardware, firmware, or any combination thereof. For illustrative purposes, the following description of process may refer to elements mentioned above. In practice, portions of process may be performed by different elements of the described system, e.g., component A, component B, or component C. It should be appreciated that process may include any number of additional or alternative tasks, the tasks shown need not be performed in the illustrated order, and process may be incorporated into a more comprehensive procedure or process having additional functionality not described in detail herein. Moreover, one or more of the tasks shown could be omitted from an embodiment of the process as long as the intended overall functionality remains intact.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method performed by a middleware server for testing a user interface comprising:
  determining a state change of a portion of the user interface;

receiving a test command indicative of a user interface functional test from a test interface;

transmitting the test command to the user interface in response to not detecting the state change of the portion of the user interface;

determining an auxiliary test associated with the test command in response to detecting the state change of the portion of the user interface;

generating an altered test command requesting performance of the user interface functional test and the auxiliary test;

transmitting the altered test command to the user interface;

receiving a functional result from the user interface in response to the altered test command;

generating an altered test result indicative of the functional result; and transmitting the altered test result to the test interface.

2. The method performed by the middleware server for testing the user interface of claim 1 wherein the altered test command includes the test command and an auxiliary test command associated with the auxiliary test.

3. The method performed by the middleware server for testing the user interface of claim 1 wherein the altered test command is indicative of the user interface functional test and an accessibility test.

4. The method performed by the middleware server for testing the user interface of claim 1 wherein the user interface functional test is performed only on the portion of the user interface.

5. The method performed by the middleware server for testing the user interface of claim 1 wherein the functional result is indicative of a first result from a performance of the user interface functional test and a second result from a performance of the auxiliary test.

6. The method performed by the middleware server for testing the user interface of claim 1 wherein the state change is determined in response to a Document Object Model.

7. The method performed by the middleware server for testing the user interface of claim 1 wherein the altered test result is indicative of the portion of the user interface.

8. A middleware server for automatic performance of user interface testing comprising:

a test interface port configured for receiving a test command indicative of a user interface functional test from a test interface and for coupling an altered test result to the test interface;

a user interface port configured for coupling the test command and an auxiliary test command to a user interface and for receiving a test result and an auxiliary test result from the user interface; and a processor configured to determine a state change of a portion of the user interface, for transmitting the test command to the user interface in response to not detecting the state change of the portion of the user interface, for determining an auxiliary test associated with the test command in response detecting the state change of the portion of the user interface, for coupling the test command and the auxiliary test command to the user interface port, for receiving the test result and the auxiliary test result, for generating the altered test result in response to the test result and the auxiliary test result, and for coupling the altered test result to the test interface port.

9. The middleware server for automatic performance of user interface testing of claim 8 wherein the test command and the auxiliary test command are coupled to the user interface through an altered test command.

10. The middleware server for automatic performance of user interface testing of claim 9 wherein the altered test command is indicative of the user interface functional test and an accessibility test.

11. The middleware server for automatic performance of user interface testing of claim 8 wherein an accessibility test is performed only on the portion of the user interface in response to the state change.

12. The middleware server for automatic performance of user interface testing of claim 8 wherein the altered test result is indicative of the test result from a performance of the user interface functional test and the auxiliary test result from a performance of an accessibility test.

13. The middleware server for automatic performance of user interface testing of claim 8 wherein the state change is determined in response to a Document Object Model.

14. The middleware server for automatic performance of user interface testing of claim 8 wherein the altered test result is indicative of the portion of the user interface.

15. The middleware server for automatic performance of user interface testing of claim 8 wherein the user interface functional test and an auxiliary test are performed only on the portion of the user interface.

16. A method for testing a user interface by a middleware server, comprising:

receiving a user interface test command from a test interface indicative of a user interface functional test;

determining a state change of a portion of the user interface;

transmitting the user interface test command to the user interface in response to not detecting the state change of the portion of the user interface;

determining an auxiliary test in response to the user interface test command and the state change in response to detecting the state change of the user interface;

determining a functional test result in response to a performance of the user interface functional test;

determining an auxiliary test result in response to a performance of the auxiliary test;

generating a combined test result in response to the auxiliary test result and the functional test result; and transmitting the combined test result to the test interface.

17. The method for testing the user interface by the middleware server of claim 16 wherein the auxiliary test is an accessibility test.

18. The method for testing the user interface by the middleware server of claim 16 wherein the user interface functional test and the auxiliary test are performed only on the portion of the user interface.

* * * * *